US 6,740,414 B2

(12) United States Patent
Yatsue

(10) Patent No.: US 6,740,414 B2
(45) Date of Patent: May 25, 2004

(54) MAGNETIC RECORDING MEDIA AND MAGNETIC RECORDING APPARATUS USED THEREOF

(75) Inventor: Toru Yatsue, Odawara (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 10/371,596

(22) Filed: Feb. 20, 2003

(65) Prior Publication Data

US 2003/0232220 A1 Dec. 18, 2003

(30) Foreign Application Priority Data

Jun. 13, 2002 (JP) ........................................ 2002-172763

(51) Int. Cl.$^7$ .............................................. G11B 5/725
(52) U.S. Cl. ................ 428/421; 428/694 TF; 427/130; 427/131
(58) Field of Search ........................... 428/421, 694 TF; 427/130, 131

(56) References Cited

U.S. PATENT DOCUMENTS 6,099,937 A    8/2000  Gui et al.
6,238,796 B1   5/2001  Liu et al.
6,316,062 B1   11/2001 Sakaguchi et al.

FOREIGN PATENT DOCUMENTS

| JP | 9-120524       | 5/1997  |
| JP | 2000-315314    | 11/2000 |
| JP | 2001-164279    | 6/2001  |
| WO | WO00/11667 A1  | 3/2000  |

*Primary Examiner*—Stevan A. Resan
(74) *Attorney, Agent, or Firm*—Townsend and Townsend and Crew LLP

(57) ABSTRACT

The disclosed invention provides a high-reliability magnetic recording apparatus, magnetic recording medium, and a method of manufacturing such a medium in a high-density magnetic recording apparatus which comprises a magnetic disk revolving at a high speed and a magnetic head which flies as low as possible over the magnetic disk. A lubricant layer formed on the outermost surface of a magnetic recording medium is constituted by a lubricant which comprises fluoropolyether as the principal ingredient. The fluoropolyether lubricant is characterized in that alcohol hydration distribution which corresponds to difference between the greatest and smallest alcohol valences among the component molecules of the fluoropolyether is adjusted to 0.48 or less and an average alcohol valence among the component molecules is adjusted to fall within a range of 3.00 to 3.91.

9 Claims, 2 Drawing Sheets

MAGNETIC RECORDING MEDIA AND MAGNETIC RECORDING APPARATUS USED THEREOF

BACKGROUND OF THE INVENTION AND RELATED ART STATEMENT

The present invention relates to magnetic recording media and magnetic recording apparatus for use with these media. More particularly, the invention relates to improvement to a lubricant layer formed on a protecting overcoat of a magnetic recording medium.

As well known, magnetic recording apparatus is divided into those using a magnetic disk as the medium on which to record data and those using magnetic tape as such medium. Because the former type of recording apparatus using a magnetic disk (hereinafter referred to as magnetic disk drives) is prevailing, the following description focuses on magnetic disk drives as an example of the magnetic recording apparatus.

As the capacity enlargement of magnetic disk drives has been pursued for recent years, the fly height of the magnetic head has been lowered rapidly down to below 30 nm, and, consequently, there is increasing need for reliability in terms of resistance to sliding friction.

Also, there is strong need to enhance the data processing speed with more disk capacity. In particular, in a Redundant Array of Independent Disks (RAID) system, a magnetic disk drive that operates at a disk revolving speed of 10,000 rmp or higher is required.

In order to ensure the reliability of a magnetic disk drive, generally, a lubricant layer is formed on a carbon overcoat on the surface of a magnetic disk for use in the disk drive. As the main material of the lubricant layer, usually, fluoropolyether which is a chemically stable fluorinated organic compound is widely used.

As lubricants of this type, commercial articles have been available on the market and used as disk lubricants, for example, Fomblin AM2001, Fomblin Z-DOL, Fomblin Z DOL-TX, Fomblin Z TETRAOL, etc. supplied by Ausimont (the company name changed to Solvay Slexis on Dec. 13, 2002), and Demnum SA, Demnum SP, etc. supplied by Daikin Industries, Ltd.

Meanwhile, as for fluoropolyether lubricants which are commonly used, a lubricant comprises fluoropolyether with average molecular weight of 1,000 to 10,000 as the backbone and a polar functional group as its end group.

In order to assure the reliability of a magnetic disk drive, it is necessary to preserve the lubricant on the surface of a magnetic disk used in the disk drive for long time.

However, when the magnetic disk drive operates, the disk revolves at a high speed and the lubricant is spun off from the disk by air shear due to the air flow on the surface of the disk as the disk revolves and the centrifugal force directly exerted on the lubricant. In consequence, the quantity of the lubricant on the surface of the disk gradually decreases. Moreover, it is known that a phenomenon of evaporation of the lubricant into the atmosphere inside the magnetic drive takes place.

To overcome this problem of the lubricant loss by being spun off during disk revolution and natural evaporation, approaches have heretofore been proposed that produced advantageous result to some extent, including a method using a lubricant with high molecular weight for which the average modular weight is more than 3,000 and a method of producing a lubricant excluding components with low molecular weight and forming a lubricant layer of this lubricant on the disk surface.

For example, commercial lubricant article Fomblin Z DOL supplied by Ausimont is based on the proposed method in which molecular weight distribution is controlled so that stable lubrication will be achieved for long time (refer to, for example, Japanese Patent Laid-Open Publication No. Hei 9-120524 and Japanese Patent Laid-Open Publication No. 2000-315314).

However, only by the molecular weight distribution control which is applied to Fomblin Z DOL, the lubricant cannot be sufficiently restrained from being spun off and evaporation from the magnetic disk surface for magnetic disk drives that operate at a high disk revolving speed of 10,000 rmp or higher or in hard environment such as high ambient temperature.

As one means for solving this problem, a method for restraining the lubricant from being spun off and evaporation has been proposed in which the adhesion force of the lubricant to the disk protecting layer is made stronger by intensifying the polarity of the functional end group in the lubricant (refer to, for example, Japanese Patent Laid-Open Publication No. 2001-164279).

Among the commercial lubricant articles available on the market, for example, Fomblin Z DOL-TX and Fomblin Z TETRAOL are known to have stronger adhesiveness than Fomblin Z DOL. Above all, Fomblin Z TETRAOL is known to have even stronger adhesiveness.

Meanwhile, a lubricant having higher adhesive force to the disk protecting layer is intrinsically of higher polarity and has such a problem in practical lubricant layer formation that it is hardly dissoluble in a solvent for preparing the lubricant solution when applying the solution in which the lubricant dissolved on top of the disk protecting layer and forming the lubricant layer. In order to apply a lubricant on top of the disk, solution in which the lubricant dissolved is prepared and a fluorinated solvent is generally used as the solvent for allowing a fluorinated lubricant such as fluoropolyether to dissolve in the solution.

As fluorinated solvents, the following can be mentioned: perfluorocarbon, fluoropolyether, hydrofluoroether, hydrofluorocarbon, hydrofluorocarbon including chlorine, etc. As typical examples of commercial articles of fluorinated solvents available on the market, the following are mentioned: e.g., PFC-5060 supplied by 3M, GALDEN supplied by Ausimont, HFE-7100 supplied by 3M, Vertrel XF supplied by Dupont, and ASAHIKLIN AK-225 supplied by Asahi Glass Company.

OBJECT AND SUMMARY OF THE INVENTION

The above-mentioned commercial lubricant article, Fomblin Z TETRAOL includes dihydric alcohol functional groups at either ends, but injection of the functional groups into either ends of molecules is not completely performed. In the Fomblin Z TETRAOL, components into which monohydric alcohol functional groups are injected coexist with non-functionalized end groups in which alcohol functional groups are not injected at all.

Due to the coexistence of the dihydric and monohydric alcohol functional groups and non-functionalized end groups, for the Fomblin Z TETRAOL, normal alcohol valences fall within a range of 3.00 to 3.95 and alcohol hydration distribution which corresponds to difference between the greatest and smallest alcohol valences among the component molecules is 0.95. Moreover, the quantities of the existing dihydric and monohydric alcohol functional groups and non-functionalized end groups vary among production lots.

In a fluoropolyether lubricant, the components with a high alcohol valence have high molecular polarity, which exhibits a lubricant property of high adhesiveness to the magnetic disk protecting layer, but they are not dissoluble in a solvent such as, for example, perfluorocarbon and fluoropolyether, which is used to allow the lubricant to dissolve in solution to be applied on top of the protecting layer. Such components are not completely dissoluble in a solvent having polarity such as hydrofluoroether, hydrofluorocarbon, and hydrofluorocarbon including chlorine. This is a trouble in the production of magnetic disks.

In a fluoropolyether lubricant, on the other hand, the components with a low alcohol valence have low molecular polarity, which exhibits a lubricant property of low adhesiveness to the magnetic disk protecting layer, and they cannot well restrain the lubricant layer thickness from decreasing for magnetic disk drives that operate at a high disk revolving speed or in hard environment such as high ambient temperature.

Seeking to solve the above-described problems of prior art, it is therefore an object of the present invention is to provide a magnetic recording medium typified by a high-reliability magnetic disk having a lubricant layer with excellent lubrication properties, a method of manufacturing thereof, and a magnetic recording apparatus for use with the magnetic recording medium.

It is another object of the present invention is to provide a high-reliability magnetic disk drive, specifically, a high-density magnetic disk drive which primarily comprises a magnetic disk revolving at a high speed and a magnetic head which flies as low as possible over the magnetic disk.

In order to solve the above-described problems, the inventors conducted tests to examine lubricants comprising fluoropolyether for dissolubility in a solvent and the adhesive property of the lubricant layer to the overcoat of the magnetic disk (degree of decrease of the lubricant layer thickness).

As a result, we obtained important findings below. By controlling the alcohol valences of a lubricant comprising fluoropolyether as the principal ingredient to fall within a certain range and adjusting alcohol hydration distribution which corresponds to difference between the greatest and smallest alcohol valences among the component molecules to a certain value, the lubricant dissoluble in a solvent can be obtained and the lubricant layer formed by applying the lubricant on the surface of a magnetic disk can be well restrained from decreasing in thickness. By this method, a magnetic recording apparatus and magnetic recording medium (magnetic disk) of high reliability and high density can be realized easily.

The present invention has been made, based on the above findings, and specific features of the invention in aspects in which the objects of the invention are achieved will be described below.

According to a first aspect of the invention, the invention provides a magnetic recording medium comprising a non-magnetic substrate and, at least, a magnet layer for carrying out magnetic recording and retrieval, a protective layer, and a lubricant layer which are formed in order on the non-magnetic substrate, wherein the lubricant layer includes fluoropolyether which is represented by chemical formula (1) which is shown below and the fluoropolyether is characterized by having alcohol hydration distribution of 0.48 or less which corresponds to difference between the greatest and smallest alcohol valences among component molecules and an average alcohol valence among component molecules within a range of 3.00 to 3.91.

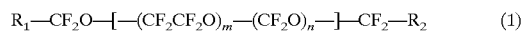  (1)

where m and n are positive integers and $R_1$ and $R_2$ are end functional groups respectively represented by:

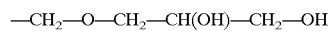

and

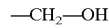

Practically desirable values of m and n in the chemical formula (1) are integers which fall within a range of 3 to 50 and the average alcohol valence among component molecules falls within a range of 3.38 to 3.91. It is desirable that the protective layer is made of carbonaceous material such as, for example, diamond like carbon. Practically desirable alcohol hydration distribution of the fluoropolyether falls within a range of 0.072 to 0.48.

According to a second aspect of the invention, the invention provides a method of manufacturing a magnetic recording medium comprising the steps of depositing and forming, at least, a magnet layer, a protective layer, and a lubricant layer in order on a non-magnetic substrate. A process of forming the lubricant layer comprises the steps of preparing a lubricant which comprises fluoropolyether as the principal ingredient, wherein the fluoropolyether is represented by chemical formula (1) which is shown below, letting the lubricant dissolve in a solvent, thus making a lubricant solution, and applying the lubricant solution on top of the protective layer formed on the substrate, wherein the fluoropolyether is characterized by having alcohol hydration distribution of 0.48 or less which corresponds to difference between the greatest and smallest alcohol valences among component molecules and an average alcohol valence among component molecules within a range of 3.00 to 3.91.

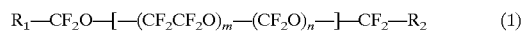  (1)

where m and n are positive integers and $R_1$ and $R_2$ are end functional groups respectively represented by:

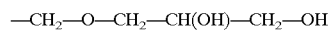

and

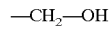

In the foregoing method of manufacturing a magnetic recording medium according to the second aspect of the invention, the step of preparing a lubricant which comprises fluoropolyether as the principal ingredient, represented by the chemical formula (1), comprises a step of fractionating and controlled extraction of fluoropolyether component molecules, using a carbon-bearing gas solvent whose density is controlled by controlling the solvent temperature and pressure by a supercritical extraction and solvent control method in which alcohol hydration distribution which corresponds to difference between the greatest and smallest alcohol valences among the component molecules of the fluoropolyether is adjusted to 0.48 or less and an average alcohol valence among the component molecules is adjusted to fall within a range of 3.00 to 3.91, based on the density of the solvent.

As the carbon-bearing gas solvent that is used in the foregoing method of manufacturing a magnetic recording medium, the following are mentioned: e.g., carbon dioxide $CO_2$, ethane $C_2H_6$, and fluoroform $CF_3H$.

More preferably, in the method of manufacturing a magnetic recording medium according to the second aspect of the invention, the step of preparing a lubricant which comprises fluoropolyether as the principal ingredient, represented by the chemical formula (1), comprises the steps of (a) letting fluoropolyether touch a carbon dioxide solvent which is placed in a supercritical or subcritical state through control of its temperature and pressure, thereby extracting fluoropolyether in the carbon dioxide solvent, (b) increasing in steps the density of the carbon dioxide which remains in the supercritical or subcritical state and includes the extracted fluoropolyether, and (c) serially extracting fractions of fluoropolyether separated, according to the carbon dioxide density increments, thereby adjusting alcohol hydration distribution which corresponds to difference between the greatest and smallest alcohol valences among the component molecules of the fluoropolyether to 0.48 or less and an average alcohol valence among the component molecules to fall within a range of 3.00 to 3.91.

In the step (c) of extracting serially extracting fractions of fluoropolyether in the step of preparing a lubricant, carbon dioxide in the supercritical state is used as its density changes within a range of 0.50 to 0.75 g/cm$^3$.

According to a third aspect of the invention, the invention provides a magnetic recording apparatus comprising, at least, a magnetic recording medium for recording data thereon and a magnetic head which writes data on the magnetic recording medium, erases data from the magnetic recording medium, and reads data from the magnetic recording medium, wherein the magnetic recording medium is constituted by the foregoing magnetic recording medium according to the first aspect of the invention.

Figure 1:
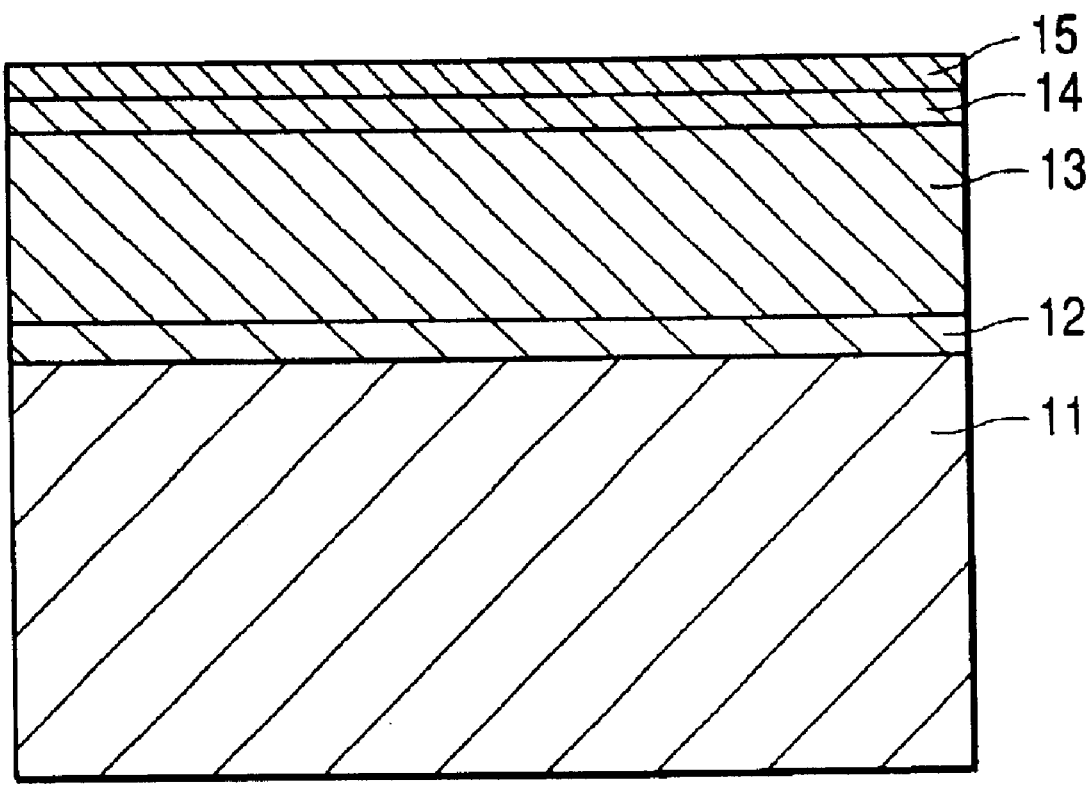
FIG. 1 is a cross sectional view of a magnetic recording medium (magnetic disk) relevant to the present invention, in which essential parts of the magnetic recording medium are shown.

DETAILED DESCRIPTION OF PREFERRED EMBODIMENTS (1) A Method of Manufacturing a Lubricant in which the Alcohol Valences are Controlled A method of controlling the alcohol valences of a fluoropolyether lubricant constituting a lubricant layer, according to the present invention, will be described. As the alcohol hydration extract controlled method (technique), a supercritical extraction and solvent control method is used. The supercritical extraction and solvent control method is a well-known method for fractionating the molecular weight of high-molecular (polymeric) compounds.

As will be described later, however, the fact that an average alcohol valence among fluoropolyether molecules and alcohol hydration distribution which corresponds to difference between the greatest and smallest alcohol valences among the component molecules can be set at certain values, respectively, which is the main point of the present invention, has not been known and the inventors are the first finders of this fact.

A method of alcohol valence control for a fluoropolyether lubricant in which the dihydric and monohydric alcohol functional groups and non-functionalized end groups coexist, according to the present invention, takes advantage of the fact that the alcohol valences of fluoropolyether molecules dissoluble in a solvent that is placed in a supercritical or subcritical state change, depending on the density of the supercritical fluid of the solvent.

The supercritical fluid greatly changes continuously from an ultra-thin low-density state (gas) to a high-density state approximating to liquid by slight change in temperature and pressure. The dissolving ability of the supercritical fluid depends on this density. Therefore, by controlling the temperature and pressure, the dissolving ability of the supercritical fluid of the solvent can be changed freely.

For example, carbon dioxide as a solvent has a critical temperature of 31.3° C. and a critical pressure of 7.38 MPa. Carbon dioxide placed in a state exceeding these temperature and pressure values and having intermediate properties between liquid and gas, that is, density approximating to liquid and a diffusion coefficient approximating to gas, is regarded as being in a supercritical state. A subcritical state, which is not well defined, is generally regarded as existing near the supercritical state. For carbon dioxide, above a temperature of about 25° C. and a pressure of about 5 MPa and below the above critical temperature and pressure, carbon dioxide having the above-mentioned intermediate properties between liquid and gas is regarded as being in the subcritical state.

As compared with other substances (solvents), carbon dioxide can be placed in the supercritical fluid state by moderate conditions and its fluid in the supercritical state is a preferable solvent particularly in view of safety and economic advantages. Thus, the illustrative embodiment of the invention will be explained, using carbon oxide as a typical example of supercritical fluid (solvent).

By controlling the dissolving ability of carbon dioxide in the supercritical fluid state having the above-described characteristics, while changing the density of carbon dioxide, and using difference in solubility by slight different in structure of the alcohol valences of the component molecules, alcohol hydration distribution which corresponds to difference between the greatest and smallest alcohol valences among the component molecules and an average alcohol valence among the molecules can be controlled to fall within a certain desirable range of values.

Solubility of fluoropolyether in carbon dioxide in the supercritical or subcritical state by the alcohol valences of the fluoropolyether molecules changes, depending on the density of carbon dioxide in the supercritical state. The higher the density of carbon dioxide, fluoropolyether with a higher alcohol valence can dissolve in the carbon dioxide solvent.

Therefore, in the present invention, first let fluoropolyether touch carbon dioxide in the supercritical or subcritical state and a molecular cutoff of fluoropolyether is extracted in the carbon dioxide solvent. Then, increase in steps the density of the carbon dioxide which remains in the supercritical or subcritical state and includes the extracted molecular cutoff of fluoropolyether. Through this process, the first extracted molecular cutoff of fluoropolyether with a low alcohol valence and molecular cutoffs of fluoropolyether with gradually higher alcohol valences are separated serially.

For carrying out the present invention, a desirable range of density of carbon dioxide in the supercritical or subcritical state is 0.50 to 0.75 g/cm$^3$. The density of carbon dioxide is controlled by temperature and pressure. In order to obtain a stable density state, it is preferable to adjust the pressure, while keeping the temperature constant. For example, if the temperature is constant at 60° C., by setting the pressure to fall within a range of 14 to 30 MPa, the above density range can be obtained.

In order to obtain a fluoropolyether lubricant with alcohol hydration distribution and an average alcohol valence among the component molecules controlled at desired values, an optimum value can be fixed from the above range.

The control of alcohol hydration distribution and an average alcohol valence among the component molecules, using carbon dioxide in the supercritical fluid state, in the present invention, can be conducted easily, using a supercritical fluid machine available on the market which primarily comprises a super critical fluid pump unit, a temperature control unit, and a back pressure control unit.

The control of functional groups $R_1$ and $R_2$ at the ends of fluoropolyether molecules, according to the present invention, takes advantage of the supercritical state of carbon dioxide as an extraction fluid. Because carbon dioxide is gas at normal temperature and pressure, a solvent removal process is not necessary for fluoropolyether extracted after the control of the functional groups. That is, because carbon dioxide naturally evaporates at normal temperature and pressure, substantially no carbon oxide will remain in the extracted fluoropolyether.

(2) A Method of Forming a Lubricant Layer by Lubricant Application

A method of forming a lubricant layer by applying fluoropolyether with the molecular end groups controlled by the above-described method on top of an overcoat of a magnetic recording medium will be described. Because a range of lubricant layer thickness which is currently used is about 0.5 to 5 nm, the application of fluoropolyether in bulk with viscosity of about 0.01 PaDs at 30° C. could make too thick a lubricant layer. Thus, before the application, solution to be applied is prepared by letting the lubricant dissolve in a solvent (a solvent including fluorine is suitable, which will be described later). The concentration of the lubricant in the solution differs, depending on the method and conditions of application.

For application methods, a dip method and a spin coat method are mentioned. Parameters for setting the concentration of the lubricant in the solution are withdraw speed for the dip method and revolution speed and revolution time for the spin coat method.

If the density of the lubricant in the solution is constant, for the dip method, the higher the withdraw speed, the thicker lubrication layer will be formed. Although depending on the material of the solvent used to prepare the lubricant solution, very small irregularities may be formed on the surface of the lubricant layer by unsuitable withdraw speed. This may occur under the influence of factors, in addition to the withdraw speed, the boiling point and heat of evaporation of the solvent used for preparing the lubricant solution and the environment of application work (temperature, humidity, and the concentrations of dispersing contaminants such as oil mist and particles in the work space).

For the spin coat method, the lower the revolution speed, the thicker lubricant layer tends to be formed. Although depending on the solvent used to prepare the lubricant-solution, very small irregularities may be formed on the surface of the lubricant layer by unsuitable revolution speed and revolution time. This may occur under the influence of factors, in addition to the revolution speed and time, the boiling point, heat of evaporation, and hygroscopicity of the used solvent.

As solvents that may be used to prepare the lubrication solution, fluorinated organic solvents such as, e.g., perfluorocarbon, fluoropolyether, hydrofluoroether, hydrofluorocarbon, and hydrofluorocarbon including chlorine can be mentioned.

As typical examples of commercial articles of fluorinated organic solvents of this kind available on the market, the following are mentioned: PFC-5060 supplied by 3M, GALDEN supplied by Ausimont (p1), HFE-7100 supplied by 3M, Vertrel XF supplied by Dupont (p1), and ASAHIKLIN AK-225 supplied by Asahi Glass Company.

(3) Application of a Lubricant

The application of a lubricant relevant to the present invention is a lubricant for providing a high-reliability magnetic recording apparatus and a magnetic recording medium for use with this magnetic recording apparatus in a high-density magnetic recording apparatus which primarily comprises a magnetic disk revolving at a high speed and a magnetic head which flies as low as possible over the magnetic disk.

The purpose of the lubricant is to reduce the friction coefficient between the magnetic recording medium and the magnetic head. Accordingly, it is reasonable that the lubricant is applied to other recording apparatus in which sliding between a recoding medium and the magnetic head takes place, besides the magnetic recording medium. The lubricant relevant to the present invention has the fluoropolyether backbone that is hydrophilic and hydrophobic and, therefore, it can be used for hydrophilic chemicals and hydrophobic chemicals which are applied to the surface of a solid such as glass and metal.

(4) Structure of a Magnetic Recording Medium

A magnetic recording medium relevant to the present invention is a magnetic recording medium having, at least, a magnetic layer and a lubricant layer which is a feature of the present invention on a non-magnetic substrate. More preferably, the magnetic recording medium has a protective layer on the magnetic layer and the lubricant layer on top of the protective layer.

FIG. 1 shows an example of a cross section of a magnetic recording medium relevant to the present invention, in which essential parts of the magnetic recording medium are shown. Reference numeral 11 denotes the non-magnetic substrate, 12 denotes an under layer, 13 denotes the magnetic layer, 14 denotes the protective layer, and 15 denotes the lubricant layer.

As the non-magnetic substrate 11, a substrate made of non-magnetic material is used. A suitable non-magnetic material may be selected from organic polymer material including olefin resin such as polyether which is, for example, polyethylene terephthalate, polyamide, plyimide, polysulfone, polycarbonate, polypropylene, etc., cellulose resin, and poly vinyl chloride resin, inorganic material including glass, ceramics, ceramic glass, and carbon, and metal material such as an aluminum alloy.

The magnetic layer 13 can be constituted by one or two or more layers of laminate and a non-magnetic intermediate layer can be inserted between two magnetic layers if two or more layers are assembled. For the material of the magnetic layer, commonly used material can be used and there is no restriction on material. For example, the following can be mentioned: e.g., metal such as Fe, Co, and Ni, a Co—Ni alloy, Co—Ni—Cr alloy, Co—Ni—Cr—Ta alloy, Co—Pt alloy, Co—Pt—Cr alloy, Co—Ni—Pt—Cr alloy, Co—Ni—Pt alloy, Fe—Co alloy, Fe—Ni alloy, Fe—Co—Ni alloy, Fe—Co—B alloy, Co—Ni—Fe—B alloy, Co—Cr alloy, Co—Pr—Cr—Ta alloy, or these alloys including metal such as Al, boron, oxygen, nitrogen, oxide, or nitride.

The magnetic layers can be formed by a well-known film growth or deposition method such as evaporation, DC sputter, AC supper, RF sputter, DC magnetron sputter, RF magnetron sputter, and ion beam sputter. The magnetic layer can be formed directly on the non-magnetic substrate or on the intervening under layer made of, for example, Cr.

As the protective layer 14, for example, a carbon protective layer made of amorphous carbon, diamond like carbon, or carbon hydride, and an oxide protective layer made of silicon dioxide or zirconia can be mentioned. The carbon protective layer is a superior protective layer, but its lubricant-adsorbability is inferior to the oxide protective layer because the number of surface functional groups is less. However, because the lubricant layer relevant to the present invention has high adhesive force to the carbon protective layer also, it is especially effective for a magnetic recording medium having a commonly used carbon protective layer.

A fluorinated lubricant obtained by the manufacturing method of the present invention has dihydric alcohol of high polarity [—$CH_2$—O—$CH_2$—CH(OH)—$CH_2$—OH] in at least either of molecular end functional groups $R_1$ and $R_2$ and, therefore, has high adhesive force to the protective layer of a magnetic recording medium. Accordingly, by applying the obtained fluorinated lubricant on top of the protective layer, a highly stable lubricant layer is formed and a magnetic recording medium having good wearability and durability can be obtained.

(5) Magnetic Recording Medium, Magnetic Recording Apparatus, and Application Thereof As the application of a magnetic recording medium of the present invention, an external memory of a computer, word processor, and the like (specifically, a hard disk drive, a flexible disk, and the like) can be mentioned. The magnetic recording medium is applicable to internal and external memories of equipment such as navigation systems, game machines, cellular phones, and PHS as well as security systems and power plant management and or control systems.

Figure 2:
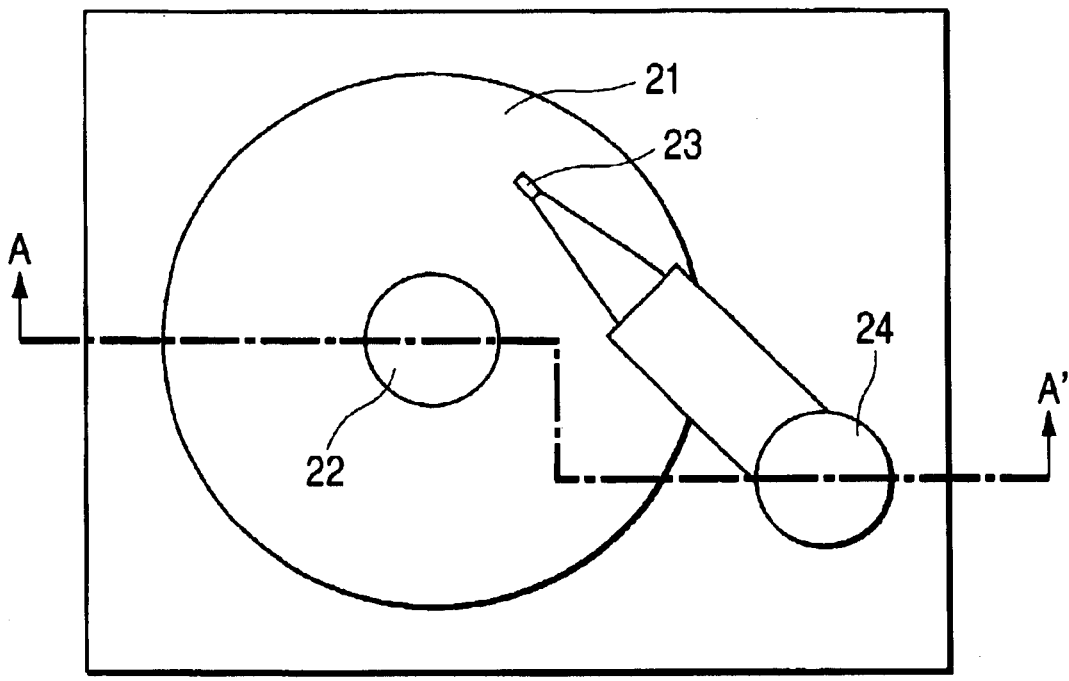
FIG. 2 is a plan view of a magnetic recording apparatus relevant to the present invention, in which essential parts of the magnetic recording apparatus are shown.
Figure 3:
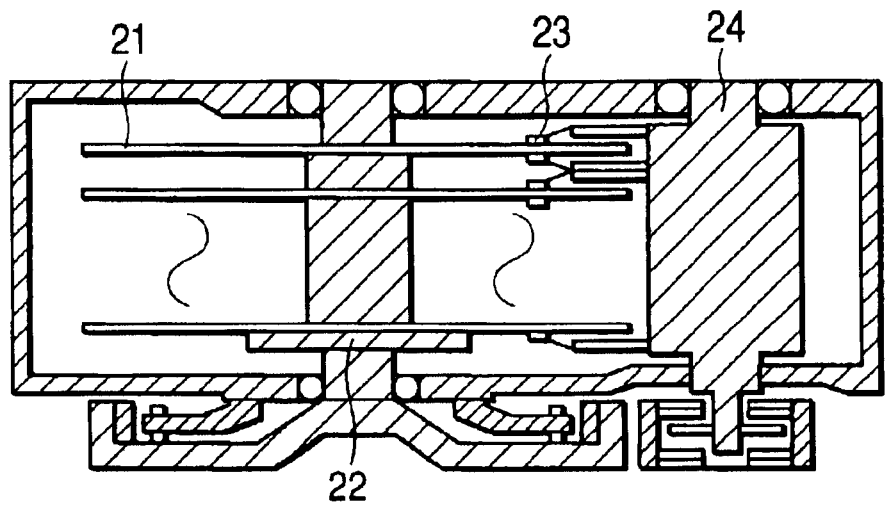
FIG. 3 shows a view of cross section A–A' in FIG. 2.

FIG. 2 and FIG. 3 show schematic illustrations of a magnetic disk drive as an example of a magnetic recording apparatus relevant to the present invention, in which essential parts of the magnetic disk drive are shown. Any magnetic recording medium 21 shown in these figures is a magnetic disk whose structure is shown in FIG. 1. A plurality of magnetic disks 21 are supported on a spindle 22. In the shown structure of the magnetic disk drive, as a magnetic disk 21 revolves, a magnetic head 23 flies on the magnetic disk 21 and can be moved radially to any position by a drive unit 24.

In the structure shown, other components of the magnetic disk drive are omitted, for example, a motor for rotating the magnetic disks 21, a controller for controlling the revolution of the motor, a controller for controlling the drive unit 24 for the magnetic heads 23, and a signal processing circuit for processing input and output signals to/from the magnetic heads 23.

A lubricant of the present invention comprising fluoropolyether as the principal ingredient, the fluoropolyether molecules including alcohol functional groups, which forms the lubricant layer as described above, in which alcohol hydration distribution and an average alcohol valence among the component molecules are controlled, is dissoluble in a fluorinated solvent and highly adhesive. This lubricant comprising fluoropolyether as the principal ingredient can be applied easily on a magnetic disk and provides a lubricant layer that is highly adhesive to the disk substrate, and, accordingly, the lubricant is very effective for magnetic disk drives which rotate magnetic disks at a high speed or operate in hard environment such as high ambient temperature.

Because the lubricant relevant to the present invention is highly adhesive to the disk substrate, the lubricant can be well restrained from being spun off from disks even with high-speed revolution of magnetic disks and, accordingly, a high-reliability magnetic disk drive can be realized.

In the following, the present invention will be explained more specifically, using its embodiment examples.

EXAMPLE 1

A Fluoropolyether Lubricant

Using commercial article, Fomblin Z TETRAOL supplied by Ausimont, which is a fluoropolyether lubricant including dihydric alcohol functional groups injected, we conducted alcohol hydration extraction from the lubricant by the supercritical fluid machine available on the market which comprises a super critical fluid pump unit, temperature control unit, and back pressure control unit.

The fluoropolyether lubricant including dihydric alcohol functional groups injected, from which we will obtain a lubricant to be applied on a magnetic disk, has molecular weight of about 2000 and is represented by the foregoing chemical formula (1) with both n and m being 8–16.

For supercritical conditions, a carbon dioxide flow rate was set at 10 ml/min, carbon dioxide density gradually increased in four steps from 0.535, 0.597, 0.685, to 0.750 g/cm$^3$, and the extraction was performed for 20 minutes in each step of density. For each carbon dioxide density, which gradually increases when extraction is conducted, the temperature and pressure of carbon dioxide are set as follows: back pressure is set at 14.3, 16.0, 19.5, and 23.5 MPa for the corresponding four steps with constant temperature of 60° C.

Four fractions of the fluoropolyether lubricant components fractionated in the density increase steps of carbon dioxide are assigned sample numbers F1, F2, F3, and F4 in the order from lower to higher pressure. For each fraction of the fluoropolyether lubricant components, we carried out spectrum measurements by 19F-NMR and 1H-NMR and evaluated alcohol hydration distribution and an average alcohol valence from the peak chemical shift and integral strength ratio.

If P1 stands for the integral sum of peaks of −83.3 ppm and −81.3 ppm which are derived from monohydric alcohol in the 10F-NMR analysis, P2 stands for the integral sum of peaks of −79.4 ppm and −77.3 ppm which are derived from dihydric alcohols and N1 stands for the integral sum of peaks of −58.3, −56.3, −29.3, and 27-7 ppm which are derived from the components without functional groups at the ends, an average alcohol valence is calculated by the following formula (2):

$$(P1 \times 2 + P2 \times 4)/(P + P2 + N1) \qquad (2)$$

If H1 stands for the integral sum of 4.75–4.90 ppm (d, 2H) derived from —OH in the 1H-NMR analysis and H2 stands for the integral sum of 4.15 ppm (m, 7H) derived from —$CH_2$, alcohol hydration distribution is calculated by the following formula (3):

$$\{[P2/(P1+P2+N1)] \times 4 \times (H2/H1/3.5)\} - \{[P1/(P1+P2+N1)] \times 2 \times (1-H2/H1/3.5)\} \qquad (3)$$

The results of the calculations are tabulated in Table 1. For F1, alcohol hydration distribution of 0.159 and an average alcohol valence among the component molecules of 3.00 were obtained. For F2, alcohol hydration distribution of 0.480 and an average alcohol valence among the component molecules of 3.38 were obtained. For F3, alcohol hydration distribution of 0.251 and an average alcohol valence among the component molecules of 3.72 were obtained. For F4, alcohol hydration distribution of 0.072 and an average alcohol valence among the component molecules of 3.91 were obtained.

As compared with the alcohol hydration distribution of 0.950 and the average alcohol valence among the component molecules of 3.66 for uncontrolled commercial lubricant article Fomblin Z TETRAOL, it was found that any of the samples F1 to F4 in the present embodiment example gives a narrower range of alcohol hydration distribution.

Fluoropolyether having a narrower range of alcohol hydration distribution than the alcohol hydration distribution of Fomblin Z TETRAOL that is basic material used was diluted down to a concentration of 0.25 weight percent with commercial fluorinated solvent articles, HFE-7100 supplied by 3M and Vertrel XF supplied by Dupont. Solubility of the thus obtained samples of fluoropolyether lubricants in the solvents is also shown in Table 1.

In the solvent solubility columns of Table 1, mark O indicates that the fluoropolyether lubricant well dissolves in the solvent and the resultant solution is transparent and colorless. On the other hand, mark X indicates that the fluoropolyether lubricant does not completely dissolve in the solvent and the resultant solution is opaque.

Comparative Example 1

In the same way as for the foregoing Example 1, using commercial article, Fomblin Z TETRAOL supplied by Ausimont, which is a fluoropolyether lubricant including dihydric alcohol functional groups injected, we conducted alcohol hydration extraction from the lubricant by the same supercritical fluid machine as used for Example 1.

For supercritical conditions for this comparative example, a carbon dioxide flow rate of 10 ml/min and carbon dioxide density of 0.768 g/cm$^3$ were set and the extraction was performed. Carbon dioxide temperature was set at 60° C. and its back pressures was set at 24.5 MPa. In this example, both the density and back pressure of carbon dioxide density are higher than those for the samples F1 to F4 of Example 1.

For fluoropolyether lubricant components extracted, we carried out 19F-NMR and 1H-NMR spectrum measurements and evaluated alcohol hydration distribution and an average alcohol valence from the peak chemical shift and integral strength ratio in the same way as for Example 1. The results were alcohol hydration distribution of 0.013 and an average alcohol valence among the component molecules of 3.92 as shown in Table 1.

As is the case for Example 1, fluoropolyether having different alcohol hydration distribution, obtained by the above-described extraction, than the alcohol hydration distribution of Fomblin Z TETRAOL that is basic material used, and Fomblin Z TETRAOL which was not subjected to the above-described extraction, were diluted down to a concentration of 0.25 weight percent with commercial fluorinated solvent articles, HFE-7100 supplied by 3M and Vertrel XF supplied by Dupont. Solubility of these fluoropolyether lubricants in the solvents is also shown in Table 1.

TABLE 1

| Sample number | Alcohol functional group | | Solvent solubility | |
|---|---|---|---|---|
| | Hydration | Distribution | HFE-7100 | Vertrel XF |
| F1 | 3.00 | 0.159 | O | O |
| F2 | 3.38 | 0.480 | O | O |
| F3 | 3.75 | 0.251 | O | O |
| F4 | 3.91 | 0.072 | O | O |
| Comparative example 1 | 3.92 | 0.013 | X | X |
| Uncontrolled Z TETRAOL | 3.66 | 0.950 | X | X |

From the results of solvent solubility of the lubricants diluted with the above-mentioned solvents, the fluoropolyether lubricant of comparative example 1 which has a high average alcohol valence among the component molecules and Fomblin Z TETRAOL which was not subjected to the above-described extraction were not well dissoluble in the fluorinated solvents and their diluted solutions became opaque. In contrast, the fluoropolyether lubricants obtained in Example 1 which have alcohol hydration distribution of 0.480 or less and an average alcohol valence among the component molecules of 3.91 or less were found to well dissoluble in the fluorinated solvents.

EXAMPLE 2

We produced sample magnetic recording media beforehand through a deposition process for forming the under layer 12 on the glass substrate 11, magnetic layer 13, and protective layer 14 made of amorphous carbon on the outermost surface in order. We prepare different solutions respectively including the lubricant samples F1, F2, F3, and F4 obtained in Example 1 as the fractions of the commercial fluoropolyether lubricant, Fomblin Z TETRAOL. Then, we formed about 1-nm thick lubricant layers 15 of these lubricant samples separately on the protective layer by dipping method and thus completed magnetic recoding media having the structure shown in FIG. 1.

We measured the lubricant layers on the magnetic recording media by TOF-SIMS. We evaluated a ratio of the peak strength of mass 155 which consists of end groups-$CF_2CH_2OCH_2(OH)CH_2OH$ components derived from dihydric alcohol to the peak strength of mass 81 which consists of end groups-$CF_2CH_2OH$ components derived from monohydric alcohol for the fractions (samples) of the fluoropolyether lubricant components. The results are shown in Table 2.

We conducted CSS (Contact Start Stop) tests for the produced magnetic recording media, using a magnetic head made of $Al_2O_3$-Tic and covered with a carbon layer. The following test conditions were set: head load of 3 gf, temperature of 25° C., humidity 40%, measured at radius 20 mm, and disk revolution speed of 15000 rpm.

The lubricant layers 15 were evaluated by a maximum friction coefficient after operation of 1000 hours and a ratio of residual lubricant thickness after the test to the initial lubricant thickness (before the test). The results are also shown in FIG. 2. As the result of evaluation per lubricant, the residual lubricant thickness (represented in percents) of a lubricant is also used as the index of the adhesive force of the lubricant layer 15 to the protective layer 14. The greater residual thickness percent indicates the more stable and better lubricant layer.

The samples F1 to F4 relevant to the embodiment example of the present invention fall within a residual lubricant thickness range of 95.2% to 97.6% which are greater than the residual lubricant thickness of a comparative example 2 (80.3%). This indicates that these lubricants decrease very little in quantity by being spun off and natural evaporation and the lubricant layers 15 have great adhesive force to the protective layer 14.

In terms of the maximum friction coefficient, the samples F1 to F4 of the example fall within a range of 0.5 to 0.7 which are smaller than 2.8 of the comparative example 2. This indicates the superior lubrication performance of the lubricant layers of the present invention.

Comparative Example 2

Using commercial article, Fomblin Z Dol supplied by Ausimont, which is a fluoropolyether lubricant including alcohol functional groups injected, we conducted alcohol hydration extraction from the lubricant by the same supercritical fluid machine as used for Example 1.

For supercritical conditions, a carbon dioxide flow rate of 10 ml/min and carbon dioxide density of 0.587 g/cm$^3$ were set and the extraction was performed. Carbon dioxide temperature was set at 60° C. and its back pressures was set at 15.7 MPa. For fluoropolyether lubricant components extracted, we carried out 19F-NMR and 1H-NMR spectrum measurements and evaluated alcohol hydration distribution and an average alcohol valence from the peak chemical shift and integral strength ratio. The results were alcohol hydration distribution of 0.960 and an average alcohol valence among the component molecules of 1.96.

In the same way as for Example 2, we produced sample magnetic recording media beforehand through a deposition process for forming the under layer 12 on the glass substrate 11, magnetic layer 13, and protective layer 14 made of amorphous carbon on the outermost surface in order. We prepares a solution including a lubricant obtained by the above-described extraction as a fraction of the commercial fluoropolyether lubricant, Fomblin Z Dol. Then, we formed about a 1-nm thick lubricant layer 15 on the protective layer by dipping the above solution and thus completed magnetic recoding media having the structure shown in Table 1.

We conducted CSS (Contact Start Stop) tests for the produced magnetic recording media, using a magnetic head made of $Al_2O_3$-Tic and covered with a carbon layer. The following test conditions were set: head load of 3 gf, temperature of 25° C., humidity 40%, measured at radius 20 mm, and disk revolution speed of 15000 rpm.

The lubricant layer was evaluated by the maximum friction coefficient after operation of 1000 hours and the ratio of residual lubricant thickness (represented in percents) after the test to the initial lubricant thickness (before the test). The results are also shown in Table 2.

TABLE 2

| Sample number | Alcohol functional group | | | Test results | |
| --- | --- | --- | --- | --- | --- |
| | Hydration | Distribution | TOF-SIMS analysis 155/81 | Maximum friction coefficients | Residual lubricant thickness |
| F1 | 3.00 | 0.159 | 0.231 | 0.6 | 95.2% |
| F2 | 3.38 | 0.478 | 0.237 | 0.5 | 96.0% |
| F3 | 3.75 | 0.251 | 0.239 | 0.5 | 96.4% |
| F4 | 3.91 | 0.072 | 0.241 | 0.7 | 97.3% |
| Comparative example 2 | 1.96 | 0.960 | 0.000 | 2.8 | 80.3% |

For the magnetic recording media using the lubricant layers of the lubricants obtained in the embodiment example which have alcohol hydration distribution of 0.480 or less and an average alcohol valence among the component molecules of 3.92 or less were found to well dissoluble in the fluorinated solvents, the maximum friction coefficients after operation of 1000 hours were less than 1.0 (0.6–0.7 for the samples F1 to F4) and the residual lubricant thickness percents were higher than 95% (95.2–97.3 for the samples F1 to F4).

In contrast, for the magnetic recording media using the lubricant layer of the lubricant obtained in the comparative example which has alcohol hydration distribution of 0.960 and an average alcohol valence among the component molecules of 1.96, the maximum friction coefficient after operation of 1000 hours was 2.8 and the residual lubricant thickness percent was 80.3%.

Therefore, fluoropolyether lubricants obtained by the manufacturing method of the present invention for which alcohol hydration distribution was controlled were able to keep having stable lubrication performance for long time and preserve lubricant layer thickness.

The results of evaluation in terms of the residual lubricant thickness (represented in percents) are as follows: 95.2% for sample F1 with an alcohol valence of 3.00 and 96.0%–97.3% for samples F2 to F4 which fall within an alcohol valence range of 3.38 to 3.91. Therefore, in order to preserve residual lubricant thickness of 96% or higher, it is desirable that an average alcohol valence of a lubricant falls within the alcohol valence range of 3.38 to 3.91 for the samples F2 to F4.

Meanwhile, the results in terms of the maximum friction coefficient show a tendency that conflicts with the lubricant characteristics in terms of the residual lubricant thickness; that is, the tendency is that the lower the alcohol valence, the smaller will be the friction coefficient.

The magnetic disk drive shown in FIG. 2 and FIG. 3 may apply either of two drive methods: CSS method and load/unload method. When the CSS method is applied, because the magnetic head contacts with a magnetic disk, a smaller friction coefficient is desirable. When the load/unload method is applied, because the magnetic head does not contact with a magnetic disk, the friction coefficient is not a key parameter and the lubricant characteristics in terms of the residual lubricant thickness should be regarded as rather important. Accordingly, depending on the drive method selected, a preferable alcohol valence should be selected.

As described in detail hereinbefore, the present invention could resolve the programs of prior art and accomplish the desired ends; that is, the invention provides a high-reliability magnetic recording apparatus, a magnetic recording medium which has a lubricant layer of excellent lubrication properties and is used with the above apparatus, and a method of manufacturing such a recording medium in a high-density magnetic recording apparatus (magnetic disk drive) which primarily comprises a magnetic disk revolving at a high speed and a magnetic head which flies as low as possible over the magnetic disk.

Specifically, a fluoropolyether lubricant constituting the lubricant layer in which alcohol hydration distribution is controlled is well dissoluble in a fluorinated solvent and highly adhesive.

By using a lubricant of the present invention as the lubricant for magnetic recording media, the lubricant can be well restrained from being spun off and natural evaporation in a magnetic disk drive which rotates magnetic disks at a high speed or operates in hard environment and a high-reliability magnetic recording apparatus can be realized.

What is claimed is:

1. A magnetic recording medium comprising a non-magnetic substrate and, at least, a magnet layer for carrying out magnetic recording and retrieval, a protective layer, and a lubricant layer which are formed in order on the non-magnetic substrate, wherein said lubricant layer includes fluoropolyether which is represented by chemical formula (1) below:

$$R_1-CF_2O-[-(CF_2CF_2O)_m-(CF_2O)_n-]-CF_2-R_2 \qquad (1)$$

where m and n are positive integers and $R_1$ and $R_2$ are end functional groups respectively represented by:

$$-CH_2-O-CH_2-CH(OH)-CH_2-OH \text{ and}$$

$$-CH_2-OH$$

wherein said fluoropolyether is characterized by having alcohol hydration distribution of 0.48 or less which corresponds to difference between the greatest and smallest alcohol valences among component molecules and an average alcohol valence among component molecules within a range of 3.00 to 3.91.

2. A magnetic recording medium according to claim 1, wherein m and n in said chemical formula (1) are integers which fall within a range of 3 to 50 and the average alcohol valence among component molecules falls within a range of 3.38 to 3.91.

3. A magnetic recording medium according to claim 1, wherein said protective layer is made of carbonaceous material.

4. A method of manufacturing a magnetic recording medium comprising the steps of depositing and forming, at least, a magnet layer, a protective layer, and a lubricant layer in order on a non-magnetic substrate, a process of forming said lubricant layer comprising the steps of:
preparing a lubricant which comprises fluoropolyether as the principal ingredient, wherein the fluoropolyether is represented by chemical formula (1) below:

$$R_1-CF_2O-[-(CF_2CF_2O)_m-(CF_2O)_n-]-CF_2-R_2 \qquad (1)$$

where m and n are positive integers and $R_1$ and $R_2$ are end functional groups respectively represented by:

$$-CH_2-O-CH_2-CH(OH)-CH_2-OH \text{ and}$$

$$-CH_2-OH$$

letting said lubricant dissolve in a solvent, thus making a lubricant solution; and
applying said lubricant solution on top of the protective layer formed on said substrate,
wherein said fluoropolyether is characterized by having alcohol hydration distribution of 0.48 or less which corresponds to difference between the greatest and smallest alcohol valences among component molecules and an average alcohol valence among component molecules within a range of 3.00 to 3.91.

5. A method of manufacturing a magnetic recording medium according to claim 4, wherein, in said step of letting said lubricant in a solvent, said lubricant dissolves in a fluorinated organic solvent, thereby making a lubricant solution.

6. A method of manufacturing a magnetic recording medium according to claim 4, wherein said step of preparing a lubricant which comprises fluoropolyether as the principal ingredient, represented by said chemical formula (1), comprises a step of fractionating and controlled extraction of fluoropolyether component molecules, using a carbon-bearing gas solvent whose density is controlled by controlling the solvent temperature and pressure by a supercritical extraction and solvent control method in which alcohol hydration distribution which corresponds to difference between the greatest and smallest alcohol valences among the component molecules of said fluoropolyether is adjusted to 0.48 or less and an average alcohol valence among the component molecules is adjusted to fall within a range of 3.00 to 3.91, based on the density of said solvent.

7. A method of manufacturing a magnetic recording medium comprising the steps of depositing and forming, at least, a magnet layer, a protective layer, and a lubricant layer in order on a non-magnetic substrate, a process of forming said lubricant layer comprising the steps of:
preparing a lubricant which comprises fluoropolyether as the principal ingredient, wherein the fluoropolyether is represented by chemical formula (1) below:

$$R_1-CF_2O-[-(CF_2CF_2O)_m-(CF_2O)_n-]-CF_2-R_2 \qquad (1)$$

where m and n are positive integers and $R_1$ and $R_2$ are end functional groups respectively represented by:

$$-CH_2-O-CH_2-CH(OH)-CH_2-OH$$

and $$-CH_2-OH$$

letting said lubricant dissolve in a solvent, thus making a lubricant solution; and
applying said lubricant solution on top of the protective layer formed on said substrate,
wherein said step of preparing a lubricant which comprises fluoropolyether as the principal ingredient, represented by said chemical formula (1), comprises the steps of (a) letting fluoropolyether touch a carbon dioxide solvent which is placed in a supercritical or subcritical state through control of its temperature and pressure, thereby extracting fluoropolyether in the carbon dioxide solvent, (b) increasing in steps the density of the carbon dioxide which remains in the supercritical or subcritical state and includes the extracted fluoropolyether, and (c) serially extracting fractions of fluoropolyether separated, according to the carbon dioxide density increments, thereby adjusting alcohol hydration distribution which corresponds to difference between the greatest and smallest alcohol valences among the component molecules of said fluoropolyether to 0.48 or less and an average alcohol valence among the component molecules to fall within a range of 3.00 to 3.91.

8. A method of manufacturing a magnetic recording medium according to claim 7, wherein, in the step (c) of extracting serially extracting fractions of fluoropolyether in the step of preparing a lubricant which comprises fluoropolyether as the principal ingredient, represented by said chemical formula (1), carbon dioxide in the supercritical state is used as its density changes within a range of 0.50 to 0.75 g/cm$^3$.

9. A magnetic recording apparatus comprising, at least, a magnetic recording medium for recording data thereon and a magnetic head which writes data on said magnetic recording medium, erases data from said magnetic recording medium, and reads data from said magnetic recording medium, wherein said magnetic recording medium is constituted by the magnetic recording medium recited in any of claims 1 to 3.

* * * * *